(12) United States Patent
Yamamoto et al.

(10) Patent No.: US 10,525,549 B2
(45) Date of Patent: Jan. 7, 2020

(54) FRICTION STIR WELDING DEVICE, AND ROTARY TOOL USED FOR FRICTION STIR WELDING

(71) Applicant: YAMAMOTO METAL TECHNOS CO., LTD., Osaka (JP)

(72) Inventors: Kengo Yamamoto, Osaka (JP); Taizoh Yamamoto, Osaka (JP); Masafumi Araki, Osaka (JP); Shigeru Nakayama, Osaka (JP); Masatoshi Enomoto, Osaka (JP)

(73) Assignee: YAMAMOTO METAL TECHNOS CO., LTD., Osaka (JP)

( * ) Notice: Subject to any disclaimer, the term of this patent is extended or adjusted under 35 U.S.C. 154(b) by 151 days.

(21) Appl. No.: 15/532,741

(22) PCT Filed: Jan. 7, 2016

(86) PCT No.: PCT/JP2016/050378
§ 371 (c)(1),
(2) Date: Jun. 2, 2017

(87) PCT Pub. No.: WO2016/111336
PCT Pub. Date: Jul. 14, 2016

(65) Prior Publication Data
US 2018/0021882 A1 Jan. 25, 2018

(30) Foreign Application Priority Data
Jan. 7, 2015 (JP) ................................. 2015-001693

(51) Int. Cl.
*B23K 20/12* (2006.01)
(52) U.S. Cl.
CPC ............................. *B23K 20/1255* (2013.01)

(58) Field of Classification Search
None
See application file for complete search history.

(56) References Cited

U.S. PATENT DOCUMENTS 8,528,803 B2 * 9/2013 Ohashi ............... B23K 20/1235
228/112.1
8,544,714 B1 * 10/2013 Obaditch ............. B23K 20/123
228/102

(Continued)

FOREIGN PATENT DOCUMENTS

CN 102490018 A * 6/2012
CN 103592047 A * 2/2014

(Continued)

*Primary Examiner* — Devang R Patel
(74) *Attorney, Agent, or Firm* — Novick, Kim & Lee, PLLC; Jae Youn Kim

(57) ABSTRACT

An objective of the present invention is to provide a friction stir welding device with which the temperature in the proximity of a weld part on a member to be welded can be intermittently measured by enabling the temperature of a plurality of sites in a rotary tool (4) used for friction stir welding to be ascertained in real-time when welding. This rotary tool (4) for a friction stir welding device comprises: a hollow channel (26a) that extends from the upper end of a shoulder part (4c) to the proximity of the lower end of a probe (4d), and that is on substantially the same axis as the axis of rotation of the shoulder part (4c); and a hollow, outer periphery channel (26b) that is apart from the axis of rotation of the shoulder part (4c) in the radial direction and in proximity of the outer periphery of the shoulder part (4c), and that extends from the upper end of the shoulder part to the proximity of the lower end thereof. A temperature measurement element (5a) is respectively disposed in the proximity of the lower end of the hollow channel and of the outer periphery channel.

9 Claims, 14 Drawing Sheets

(56) References Cited

U.S. PATENT DOCUMENTS

| | | | | |
|---|---|---|---|---|
| 2005/0001009 A1* | 1/2005 | Raether | ............. | B23K 20/1235 |
| | | | | 228/2.1 |
| 2014/0027496 A1* | 1/2014 | Castillo | ................. | B23K 20/12 |
| | | | | 228/102 |
| 2016/0097687 A1* | 4/2016 | Araki | ................ | B23Q 17/0985 |
| | | | | 374/154 |

FOREIGN PATENT DOCUMENTS

| | | | |
|---|---|---|---|
| CN | 102322972 B | * | 4/2014 |
| JP | 2004-174508 A | | 6/2004 |
| JP | 2004-538156 A | | 12/2004 |
| JP | 2006288419 A | | 10/2006 |
| JP | 2007-237281 A | | 9/2007 |
| JP | 2011115842 A | | 6/2011 |
| WO | WO-2007006669 A1 | * | 1/2007 .......... B23K 20/123 |

* cited by examiner

FRICTION STIR WELDING DEVICE, AND ROTARY TOOL USED FOR FRICTION STIR WELDING

TECHNICAL FIELD

The present invention relates to friction stir welding that is capable of measuring the temperatures of members to be welded during welding in real time and a rotary tool used for friction stir welding, the rotary tool inputting heat into the members to be welded during welding.

BACKGROUND ART

Friction stir welding is a welding method invented by TWI (The Welding Institute) in the United Kingdom in 1991, in which members to be welded are stirred (to induce plastic flow) after the deformation resistance of members to be welded is reduced by frictional heat, there achieving welding. In friction stir welding, welding is performed in a solid phase, unlike general fusion welding, in which a junction is fused. Consequently, it is known that the structure of the junction is refined, thereby exhibiting excellent mechanical properties.

To date, the practical application of friction stir welding has become greatly prevalent in the industrial world, and various kinds of research on further application to new fields have been enthusiastically carried out. In particular, a method of easily welding members to be welded having a large plate thickness, which are difficult to weld, or easily welding members to be welded made of different metal materials thanks to the characteristics of friction stir welding is required.

Welding conditions for friction stir welding generally includes the load of a rotary tool, the rotational speed of the rotary tool, the movement speed of the rotary tool, and the forward angle of the rotary tool, the parameters of which are adjusted to achieve desired welding. The most important factor in examining the welding conditions for friction stir welding is heat input to the members to be welded. In order to enable plastic flow of a junction due to stirring, it is necessary to provide a quantity of heat sufficient to reduce the deformation resistance of the members to be welded. Meanwhile, excessive heat input unnecessarily softens the members to be welded, unnecessary burrs are generated by gouging the junction, or the mechanical properties of the junction are reduced due to the slow cooling rate.

In addition, it is understood that it is also difficult to achieve welding of members to be welded having a large plate thickness or welding of members to be welded made of different materials due to heat input during welding. Particularly, in order to achieve welding of members to be welded having a large plate thickness, it is necessary to generate uniform plastic flow over the entire plate thickness, and uniform heat input is required from the welding surface against which the rotary tool is pushed to the rear surface. Moreover, in order to achieve welding of members to be welded made of different materials, it is necessary to mix two kinds of members to be welded as uniformly as possible due to plastic flow, and the deformation resistances of the two kinds of members to be welded must be reduced so as to be almost equal to each other by controlling heat input during welding.

RELATED ART DOCUMENT

Patent Document

Patent Document 1: Japanese Patent Application Publication No. 2006-288419

Patent Document 2: Japanese Patent Application Publication No. 2011-115842

DISCLOSURE OF THE INVENTION

Problem to be Solved by the Invention

Under the circumstances, however, there is a necessity for seeking welding conditions through ex post facto trial and error based on repeated welding tests in order to weld, particularly, members to be welded having a large plate thickness, and an enormous amount of time is required to adjust the respective parameters constituting the welding conditions for friction stir welding. Meanwhile, when welding members to be welded made of different materials, it is very difficult to weld members to be welded requiring very different amounts of heat input in order to reduce ex post facto trial and error deformation resistance.

Therefore, the present invention has been made in view of the above problems, and it is an object of the present invention to provide a friction stir welding device that is capable of observing the temperatures of a rotary tool used for friction stir welding at a plurality of regions thereof in real time at the time of welding in order to precisely evaluate the amount of heat input to members to be welded at the time of welding, thereby indirectly measuring the temperature of the vicinity of a junction of the members to be welded.

Meaning for Solving the Problem

A friction stir welding device according to the present invention, provided in order to solve the above problems, includes a rotary tool having a cylindrical shoulder part rotatable about an axis of rotation and a probe coupled to the lower end of the shoulder part, rotated about the same axis as the axis of rotation, and protruding downward so as to contact members to be welded, a tool holder connected to the upper side of the rotary tool and rotated about the same axis as the rotary tool in cooperation with the rotary tool, and a device body having a mechanism connected to the upper side of the tool holder, rotating the rotary tool and the tool holder about the axis of rotation, and moving the rotary tool and the tool holder in an axial direction so as to press the members to be welded. In addition, in the friction stir welding device according to the present invention, the rotary tool at least includes a hollow lower end channel extending from the upper end of the shoulder part to the vicinity of the lower end of the probe, and a hollow outer edge channel spaced apart from the axis of rotation in a radial direction to the vicinity of the outer edge of the shoulder part and extending from the upper end of the shoulder part to the vicinity of the lower end of the shoulder part, wherein temperature measurement elements (for example, thermocouples in this embodiment) are provided in the lower end channel and the outer edge channel, the temperature measurement elements being located in the vicinity of the lower ends of the lower end channel and the outer edge channel.

The friction stir welding device according to the present invention further includes a transmission means for transmitting a temperature measurement result created using a temperature measurement means from the respective temperature measurement elements.

In a friction stir welding device according to a first embodiment of the present invention, channels, having temperature measurement elements disposed therein, are provided in the rotary tool that is rotated about the axis in order to input heat into the members to be welded. Specifically, channels (e.g. a lower end channel and an outer edge channel (meanwhile, a further channel will be described later)) are provided in the rotary tool at least two positions thereof, for example, in the rotary tool in the vicinity of the lower end of the center of rotation of the probe and in the rotary tool in the vicinity of the outer edge of the shoulder part in the radial direction, and temperature measurement elements such as thermocouples (hereinafter, also simply referred to as "thermocouples") are disposed at the positions. Temperature data from the respective temperature measurement elements are transmitted to an external temperature analysis device via a transmission means provided at a position at which the transmission means is integrally rotated with the friction stir welding device.

The reason that temperature measurement elements are provided at two positions is as follows. First, the vicinity of the lower end of the probe is a position at which the temperatures of the members to be welded increase to the maximum temperature during welding (see FIGS. 2 and 3, which will be described later). Consequently, it is necessary to position a thermocouple at this position in order to perform temperature measurement. In addition, the temperatures of the members to be welded during welding at the shoulder part are lower than those of the members to be welded at the tip of the probe, and the rotational speed at the contact portion of the shoulder part is high (i.e. the temperature increase speed is high). On the other hand, the temperature at the outer edge of the shoulder part is also affected by changes in external environmental conditions. Consequently, the inventors of the present application have found that it is desirable to provide thermocouples at at least two positions as essential measurement positions, and the channels are disposed at those positions.

In addition, in a friction stir welding device according to a second embodiment of the present invention, the rotary tool at least includes a hollow lower end channel extending from the upper end of the shoulder part to the vicinity of the lower end of the probe and a hollow root channel extending from the upper part of the shoulder part to the vicinity of the junction of the shoulder part and the probe, wherein temperature measurement elements are provided in the lower end channel and the root channel, the temperature measurement elements being located in the vicinity of the lower ends of the lower end channel and the root channel.

In the friction stir welding device according to the second embodiment of the present invention, the root channel is provided in the vicinity of the junction of the shoulder part and the probe as a place at which the temperature measurement element is provided, in addition to the lower end channel. In friction stir welding, the thermal effects of the junction in the plate thickness direction may also be considered. Specifically, at the time of friction stir welding, the uniformity of temperature in the depth direction may not be guaranteed. This is particularly remarkable in the case in which the members to be welded are thick. The reason for this is that nonuniformity of composition flow at the time of friction stir welding occurs, with the result that the welded state of the entire area in the depth direction (i.e. in the plate thickness direction) becomes nonuniform. The inventors of the present application have also paid attention to this point. In order to perform measurement in real time even in the depth direction at the time of welding, the root channel is provided.

Furthermore, the inventors of the present application have verified the temperature at the probe in greater detail based on the result of the friction stir welding device according to the first embodiment of the present invention (see FIGS. 11 to 14, which will be described later) and have found that the initial temperature of the root portion of the probe increases more slowly than that of the lower end of the probe, but the maximum temperature and the maximum temperature access time at the root portion of the probe almost approximate those at the lower end of the probe. When observing the change in deviation of the temperature of the lower end channel and the temperature of the root channel from this verification, it is possible to predict that the temperature of the probe of the rotary tool is approaching the maximum temperature. In the second embodiment of the present invention, thermocouples are provided at two positions, for example, in the vicinity of the lower end of the prove and in the vicinity of the root, as essential measurement positions, in consideration of this point.

In addition, in the friction stir welding device according to the two embodiments of the present invention, a transmission means for transmitting temperature data of the respective thermocouples to the outside is provided at a position at which the transmission means is coupled to a device that is rotated in cooperation with the rotary tool. Consequently, it is advantageous in that it is possible to measure the rotational state of the rotary tool. That is, in the case in which friction stir welding is performed using the rotary tool, it is possible to indirectly observe the temperatures of the members to be welded during welding in real time through the rotary tool.

In the friction stir welding device according to the present invention, therefore, it is possible to easily evaluate welding conditions used for welding based on the temperatures of the members to be welded, which are observed in real time. As a result, it is possible to derive welding conditions optimal for the members to be welded from the state of heat input to the members to be welded during welding in the device according to the present invention, although it is necessary to seek welding conditions suitable for welding the members to be welded by evaluating the external appearance of the members to be welded after welding, the microstructure of the junction, and the mechanical properties of the junction in detail in the conventional art.

In addition, in the friction stir welding device according to the present invention, the rotary tool may further include a hollow auxiliary channel for the probe extending from the upper end of the shoulder part to an intermediate position of the probe part in the depth direction (i.e. an intermediate position in the direction of the axis of rotation) in the probe part at a position spaced apart from the axis of rotation in the radial direction. A thermocouple is provided in the auxiliary channel for the probe, the thermocouple being located in the vicinity of the lower end of the auxiliary channel for the probe, and a temperature measurement result is created using the temperature measurement means from the thermocouple.

In the case in which the auxiliary channel is provided in the probe part of the rotary tool, it is possible to observe the temperature of the middle part of the lower end channel and the outer edge channel or the temperature of the middle part of the lower end channel and the root channel. Consequently, it is possible to guarantee the uniformity of temperature in the depth direction at the time of friction stir welding, whereby it is possible to obtain uniform plastic flow over the entire plate thickness.

The temperature measurement means and the transmission means may be mounted to the tool holder.

The tool holder is closer to the members to be welded than the device body, and a load cell used for high-precision vibration measurement is suitably provided at the tool holder. In the case in which a temperature measurement means is provided at the tool holder, therefore, it is advantageous in that it is possible to provide the tool holder as a unit including various kinds of measurement means. On the other hand, the tool holder is a semi-expendable good but does not exhibit expendability (very high damage resistance and very low exchangeability) like the rotary tool. Consequently, the tool holder may be configured as various kinds of removable measurement units.

Meanwhile, the temperature measurement means may also be mounted to the device body. In this case, it is possible to greatly reduce the possibility of damage, compared with the case in which the temperature measurement means is provided at the tool holder.

In addition, in the friction stir welding device according to the present invention, the lower end channel and the outer edge channel, or the lower end channel, the outer edge channel, and the auxiliary channel for the probe are arranged in almost the same radial direction. At the time of welding two members to be welded that are made of different materials, the temperature measurement means, which is synchronized with the rotation of the rotary tool, may perform temperature measurement when the respective channels are positioned on one of the members to be welded and may perform temperature measurement again when the respective channels are positioned on the other of the members to be welded, which are repeated.

In the friction stir welding device according to the present invention, the measurement timing of the temperature measurement means is synchronized with the rotation of the rotary tool such that temperature measurement is performed when the thermocouples in the respective channels are positioned on the members to be welded that are made of different materials. As a result, it is possible to measure the temperatures of the members to be welded that are made of different materials during welding. In addition, it is possible to make uniform the deformation resistances of the respective members to be welded by controlling heat input to the respective members to be welded, whereby it is possible to achieve excellent welding.

In addition, the temperature measurement means may perform temperature measurement while the rotary tool is rotated by a predetermined angle after the channels in the rotary tool enter the respective members to be welded and move a predetermined angle, which is set as allowable temperature measurement time, and may average results of the temperature measurement.

As an example of real-time temperature measurement during welding of the different materials, as described above, temperature measurement may be performed within an angular range until the temperature measurement element (i.e. the thermocouple) exits from one of the different materials after the temperature measurement element enters the one of the different materials and is rotated by a predetermined angle. In this case, the temperature measurement time of the thermocouple is considered. The time taken for the previously measured temperature of one of the members to be welded to change to the measured temperature of the one of the members to be welded at that time and the time taken for the temperature of the one of the members to be welded to change to the next measured temperature of the one of the members to be welded are provided to define the temperature measurement time of the one of the members to be welded such that temperature measurement is synchronized with the operation of the rotary tool. In the case in which the temperatures of the one of the members to be welded are averages within the temperature measurement time, it is possible to easily estimate the temperatures of the members to be welded that are made of different materials even when the rotary tool is rotated at a high speed.

Meanwhile, the measurement by the temperature measurement means may be performed at a plurality of points while being synchronized with the rotation of the rotary tool within the allowable temperature measurement time of one of the members to be welded, and the temperatures may be averaged.

In addition, the temperature measurement means may perform temperature measurement when the channels in the rotary tool enter the members to be welded at a predetermined angle (i.e. at a representative angle).

In addition, the present invention is characterized in that the rotary tool rotatably contacts the junction of the members to be welded in the friction stir welding device. Specifically, there is provided a rotary tool used for friction stir welding, the rotary tool having a cylindrical shoulder part rotatable about an axis of rotation and a probe coupled to the lower end of the shoulder part, rotated about the same axis as the axis of rotation, and protruding downward so as to contact members to be welded, wherein the rotary tool includes a tool holder connected to the upper side of the rotary tool and rotated about the same axis as the rotary tool in cooperation with the rotary tool, and a device body having a mechanism connected to the upper side of the tool holder, rotating the rotary tool and the tool holder about the axis of rotation, and moving the rotary tool and the tool holder in an axial direction so as to press the members to be welded, and wherein the rotary tool at least includes a hollow lower end channel extending from the upper end of the shoulder part to the vicinity of the lower end of the probe on almost the same axis as the axis of rotation, and a hollow outer edge channel spaced apart from the axis of rotation in a radial direction to the vicinity of the outer edge of the shoulder part and extending from the upper end of the shoulder part to a vicinity of the lower end of the shoulder part.

On the other hand, friction stir welding may be performed using a so-called flat rotary tool. Another embodiment of the present invention is also applied to this type of rotary tool. Specifically, there is provided a friction stir welding device including a rotary tool having a cylindrical shoulder part rotatable about an axis of rotation, the shoulder part having a lower end surface formed in an approximately planar shape, a tool holder connected to the upper side of the rotary tool and rotated about the same axis as the rotary tool in cooperation with the rotary tool, and a device body having a mechanism connected to the upper side of the tool holder, rotating the rotary tool and the tool holder about the axis of rotation, and moving the rotary tool and the tool holder in an axial direction so as to press the members to be welded, wherein the rotary tool at least includes a hollow lower end channel extending to the vicinity of the lower end of the shoulder part on almost the same axis as the axis of rotation, and a hollow outer edge channel spaced apart from the axis of rotation in a radial direction and extending from the upper end of the shoulder part to the vicinity of the lower end of the shoulder part, wherein temperature measurement elements (e.g. thermocouples) are provided in the hollow channel and the outer edge channel, the temperature measurement elements being located in the vicinity of the lower ends of the hollow channel and the outer edge channel, and wherein the friction stir welding device further includes a transmission means for transmitting a temperature measurement result created using a temperature measurement means from the respective temperature measurement elements (i.e. the respective thermocouples).

Meanwhile, the characteristics of the flat rotary tool are the same as those of the present invention described above. Specifically, there is provided a rotary tool used for friction stir welding, the rotary tool having a cylindrical shoulder part rotatable about an axis of rotation, the shoulder part having a lower end surface formed in an approximately planar shape, wherein the rotary tool includes a tool holder connected to the upper side of the rotary tool and rotated about the same axis as the rotary tool in cooperation with the rotary tool and a device body having a mechanism connected to the upper side of the tool holder, rotating the rotary tool and the tool holder about the axis of rotation, and moving the rotary tool and the tool holder in an axial direction so as to press the members to be welded, and wherein the rotary tool at least includes a hollow lower end channel extending from the upper end of the shoulder part to the vicinity of the lower end of the shoulder part on almost the same axis as the axis of rotation, and a hollow outer edge channel spaced apart from the axis of rotation in a radial direction and extending from the upper end of the shoulder part to the vicinity of the lower end of the shoulder part.

Effects of the Invention

In the friction stir welding device according to the present invention and the rotary tool used therefor, it is possible to easily evaluate welding conditions used for welding from the temperatures of the members to be welded, which are observed in real time. As a result, it is possible to derive welding conditions optimal for the members to be welded from the state of heat input to the members to be welded during welding in the device according to the present invention, although it is necessary to seek welding conditions suitable for welding the members to be welded by evaluating the external appearance of the members to be welded after welding, the microstructure of the junction, and the mechanical properties of the junction in detail in the conventional art.

BEST MODE FOR CARRYING OUT THE INVENTION

<<Outline of Friction Stir Welding Device>>

Figure 1:
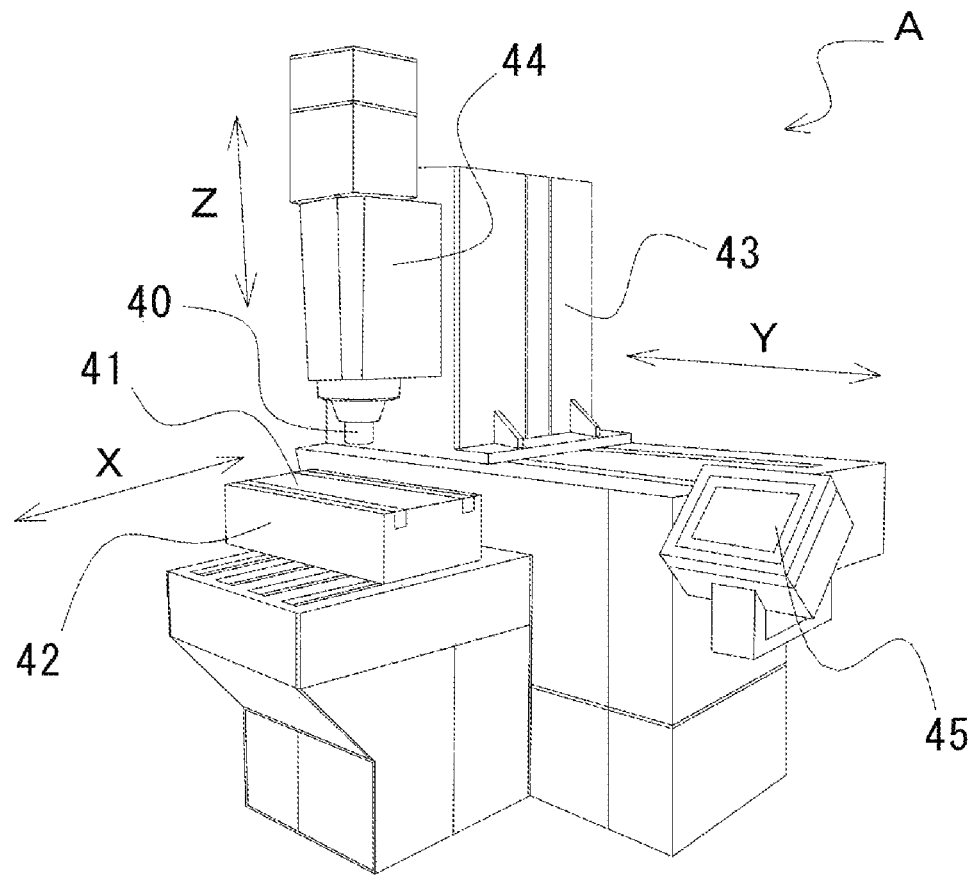
FIG. 1 is a view showing a friction stir welding device body including a friction stir welding device according to the present invention.

FIG. 1 is a view showing a friction stir welding device body A (hereinafter, also referred to as a "device body A") including a friction stir welding device body according to the present invention. As a premise to describe an embodiment of the present invention, the construction and welding process of the device body A will be described hereinafter. The device body A generally includes a tool holder gripper 40, a members-to-be-welded installation surface 41, a work stage 42, a head support base 43, a head 44, and an operation panel 45. Meanwhile, members denoted by reference symbols that are not shown in FIG. 1 refer to FIG. 2 and others, which will be described later.

First, a tool holder 2, which holds a rotary tool 4 rotatably contacting two members to be welded (not shown) (the contacting direction=the direction indicated by the arrow Z and the rotational direction=the direction about the axis indicated by the arrow Z), is mounted to the tool holder gripper 40. As a result, the tool holder gripper 40, the tool holder 2, and the rotary tool 4 are integrally rotated. In addition, the members to be welded are placed on the members-to-be-welded installation surface 41, which is located on the upper surface of the work stage 42. The members to be welded are fixed to the members-to-be-welded installation surface 41 using a fixing clamp (not shown), a fixing bolt (not shown), or the like.

In this state, a user operates the operation panel 45 to move the work stage 42 in the X direction such that the members to be welded are stopped and positioned at the position at which the rotary tool 4 is positioned right above a desired welding position.

Subsequently, the operation panel 45 is operated in the state of being stopped and positioned on the members to be welded such that the rotary tool 4 is moved downward to contact the members to be welded, is rotated while pressing the junction of the members to be welded, and is moved in the welding direction. At this time, the user may input at least parameters of the tool load imposed on the rotary tool 4, the tool movement speed, which is the welding speed, and the tool rotation speed of the rotary tool 4 in advance to set welding conditions used for friction stir welding. Meanwhile, although not shown, the rotary tool 4 may be inclined in the forward direction (i.e. the welding direction). The forward angle of the rotary tool 4 is set by changing the fitting angle of the head 44 and the head support base 43.

When setting using the operation panel 45 is completed, the rotary tool 4 is rotated right above the members to be welded. When the rotational speed of the rotary tool 4 reaches the set tool rotation speed, the head 44 is moved downward in the Z direction to press the rotary tool 4 on a welding start point of the members to be welded. When the head 44 presses the rotary tool at the tool load set in advance on the members to be welded, a contact part of the rotary tool 4 and the members to be welded (i.e. a part to be welded) reduces deformation resistance of the members to be welded due to frictional heat, and the material in the vicinity of the contact part starts to be stirred by the rotation of the rotary tool 4.

Subsequently, the head support base 43 is moved in the Y direction at the set tool movement speed to carry the rotary tool 4 from the welding start point to a welding end point such that the members to be welded are welded. When desired welding is achieved, the head 44 is moved upward in the Z direction while maintaining the rotation of the rotary tool 4 such that the rotary tool 4 is pulled out from the welding end point, and then the rotation of the rotary tool 4 is stopped. Welding is completed through the above process.

<<Outline of Rotary Tool and Connection Member of Friction Stir Welding Device According to the Present Invention>>

Figure 2:
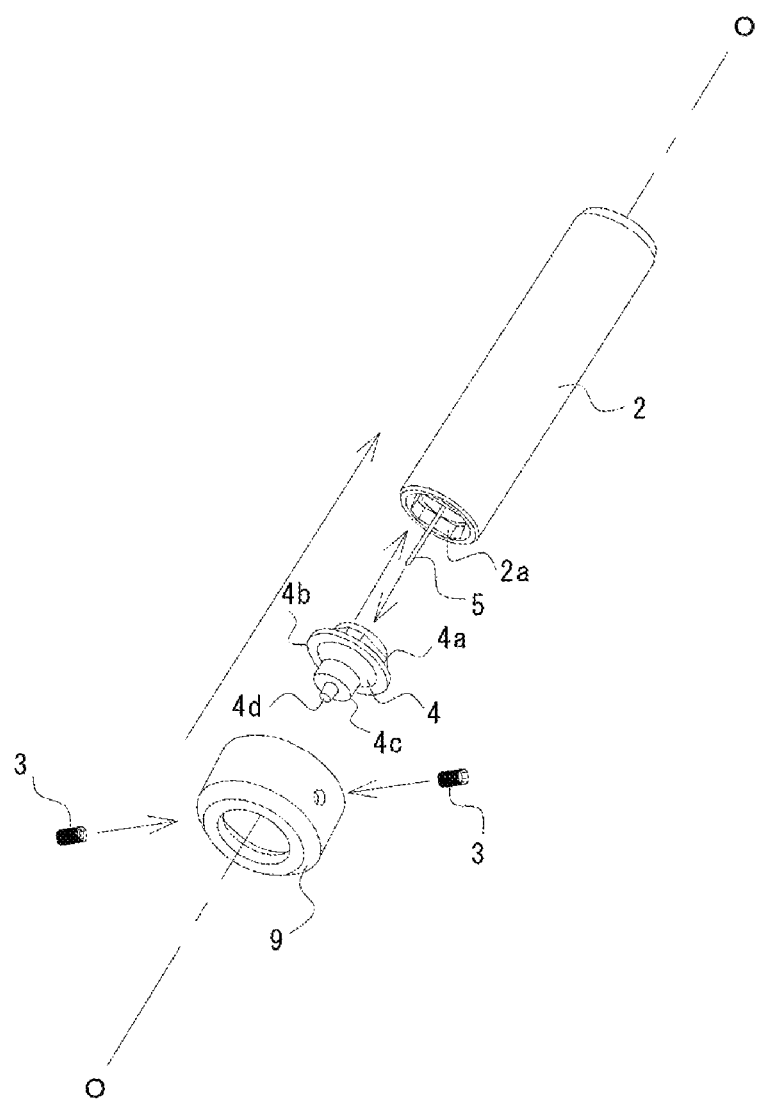
FIG. 2 is an enlarged assembly view showing a rotary tool and a tool holder that is gripped and fixed by a tool holder gripper of the device body A shown in FIG. 1.
Figure 3:
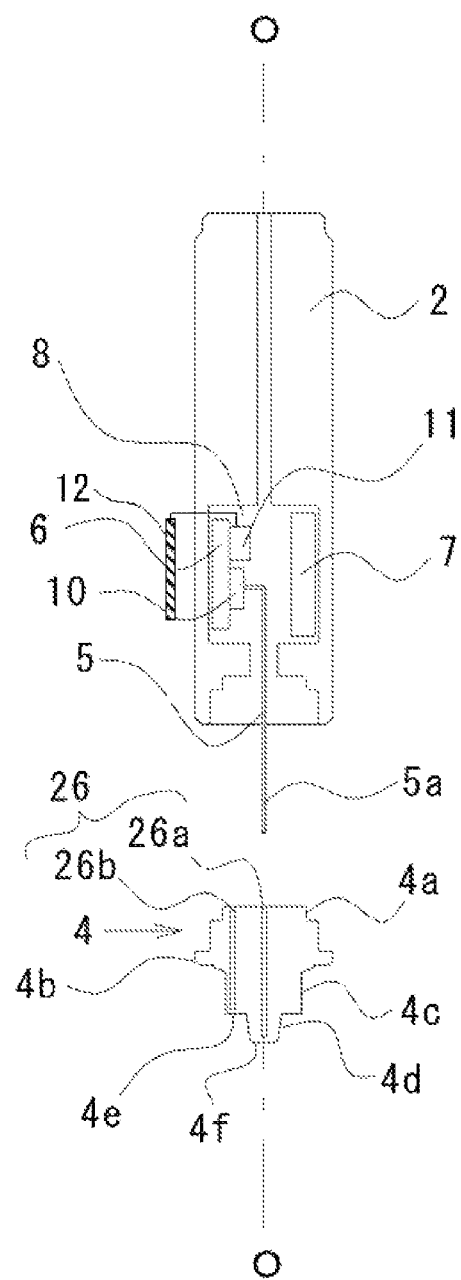
FIG. 3 is an exploded sectional view showing the tool holder of FIG. 2 and the rotary tool connected thereto when viewed in the direction of the axis of rotation.

Next, a description will be given of the rotary tool 4 and the tool holder 2 gripped and fixed by the tool holder gripper 40 of the device body A described above. FIG. 2 is an enlarged assembly view showing the tool holder 2 and the rotary tool 4. In addition, FIG. 3 is an exploded sectional view showing the tool holder of FIG. 2 and the rotary tool connected thereto when viewed in the direction of the axis of rotation. As shown in FIG. 2, a temperature measurement device 1 includes a cylindrical tool holder 2, fixing screws 3, a rotary tool 4, a temperature measurement part 5, an electronic board 6 (see FIG. 3), a power supply part 7 (see FIG. 3), and a rotary tool fixing nut 9. Meanwhile, FIG. 2 shows the top and bottom of the page in the state of being diagonally oriented from the upper right to the lower left, and arrows on the page indicate directions in which the respective members are assembled.

The tool holder 2 is rotatable about an axis of rotation O-O, and a hollow hole 8 is provided in the tool holder 2 so as to extend to opposite ends of the tool holder 2 along the axis of rotation O-O. First, the upper end a of the rotary tool 4 is inserted into a rotary tool fixing hole 2a, which is open at the lower end of the tool holder 2. At this time, the inner wall of the rotary tool fixing hole 2a and the outer wall of the upper end a of the rotary tool 4 are formed so as to be fitted mutually, whereby the tool holder 2 and the rotary tool 4 are positioned in the circumferential direction. In addition, a protrusion (not shown) formed in the lower end of the rotary tool fixing hole 2a serves as a stopper, whereby the rotary tool 4 and the tool holder 2 are positioned in the direction of the axis of rotation O-O by a flange part 4b of the rotary tool 4.

Subsequently, the rotary tool fixing nut 9 is put on the lower end of the tool holder 2 and the rotary tool 4 so as to cover the lower end of the tool holder 2 and the rotary tool 4 in the state in which the rotary tool 4 is inserted into the tool holder 2, and the tool holder 2 and the rotary tool 4 are fixed at opposite sides of the tool holder 2 and the rotary tool 4 in the direction that is perpendicular to the direction of the axis of rotation O-O of the tool holder 2 (i.e. the radial direction) using the fixing screws 3. As a result, the tool holder 2 is integrally rotated with the rotary tool 4.

Next, the rotary tool 4 will be described with reference to FIG. 3. As described above, the rotary tool 4 is a tool used for welding the members to be welded. The rotary tool 4 includes a cylindrical shoulder part 4c rotatable about the axis of rotation O-O and a probe 4d coupled to the lower end of the shoulder part so as to rotate about the same axis as the axis of rotation and protruding downward so as to contact the members to be welded.

The rotary tool 4 is provided with two blind holes 26, which are formed by drilling downward from the upper end 4a of the shoulder part 4b in the direction of the axis of rotation. Specifically, a hollow lower end channel 28, which extends from the upper end of the shoulder part 4c to the vicinity of the lower end of the probe, is provided on almost the same axis as the axis of rotation O-O, and a hollow outer edge channel 30, which extends from the upper end of the shoulder part 4c to the vicinity of the lower end of the shoulder part 4c, is formed in the vicinity of the outer edge of the shoulder part 4c, i.e. at a position of the shoulder part 4c at which drilling and strength of the shoulder part 4c are limited in the radial direction from the axis of rotation O-O. Meanwhile, the lower limit positions of the lower end channel 28 and the outer edge channel 30 may be spaced apart from the lower surfaces 4e and 4f of the rotary tool to such an extent that the hollow hole is not open even at the durable limit of the rotary tool 4.

In addition, the temperature measurement part 5 is provided at the lower side thereof with a temperature measurement element 5a, such as a thermocouple, a thermistor, and a platinum resistance thermometer sensor, (hereinafter, described as a thermocouple 5a), and an electrical wire (not shown) is connected to the thermocouple 5a. The thermocouple 5a is disposed in the vicinity of the lower ends of the hollow channel 26a and the outer edge channel 26b. The temperature measurement part 5 is connected to the electronic board 6, which is mounted to the tool holder 2, via an electrical wire disposed above the temperature measurement part 5. The result of temperature measurement performed on the thermocouple 5a is transmitted to the electronic board 6 via the electrical wire.

The electronic board 6 is provided in the hollow hold 8, which is provided in the tool holder 2. The electronic board 6 includes a temperature reception unit 10 and a transmission unit 11. The temperature reception unit 10 is configured to receive a measured temperature from the temperature measurement part 5 in real time via an electrical wire (not shown). The transmission unit 11 is configured to transmit the measured temperature, received by the temperature reception unit 10, to an external unit 20 (see FIG. 4) via a transmission antenna 12 in a wireless fashion.

The power supply part 7 is provided at the inner wall of the hollow hole 8 in the tool holder 2. The power supply part 7 is configurable using a rechargeable or non-rechargeable battery. The power supply part 7 is configured to supply power to the electronic board 6. Meanwhile, the electronic board 6 and the power supply part 7 may be integrally mounted to the tool holder 2, although the electronic board 6 and the power supply part 7 are provided in the hollow hole 8 in the tool holder 2 in the example of FIG. 3. Alternatively, the electronic board 6 and the power supply part 7 may be provided at the outside of the tool holder 2, e.g. the outer circumferential wall of the tool holder 3, and may be covered by a cover.

Figure 4:
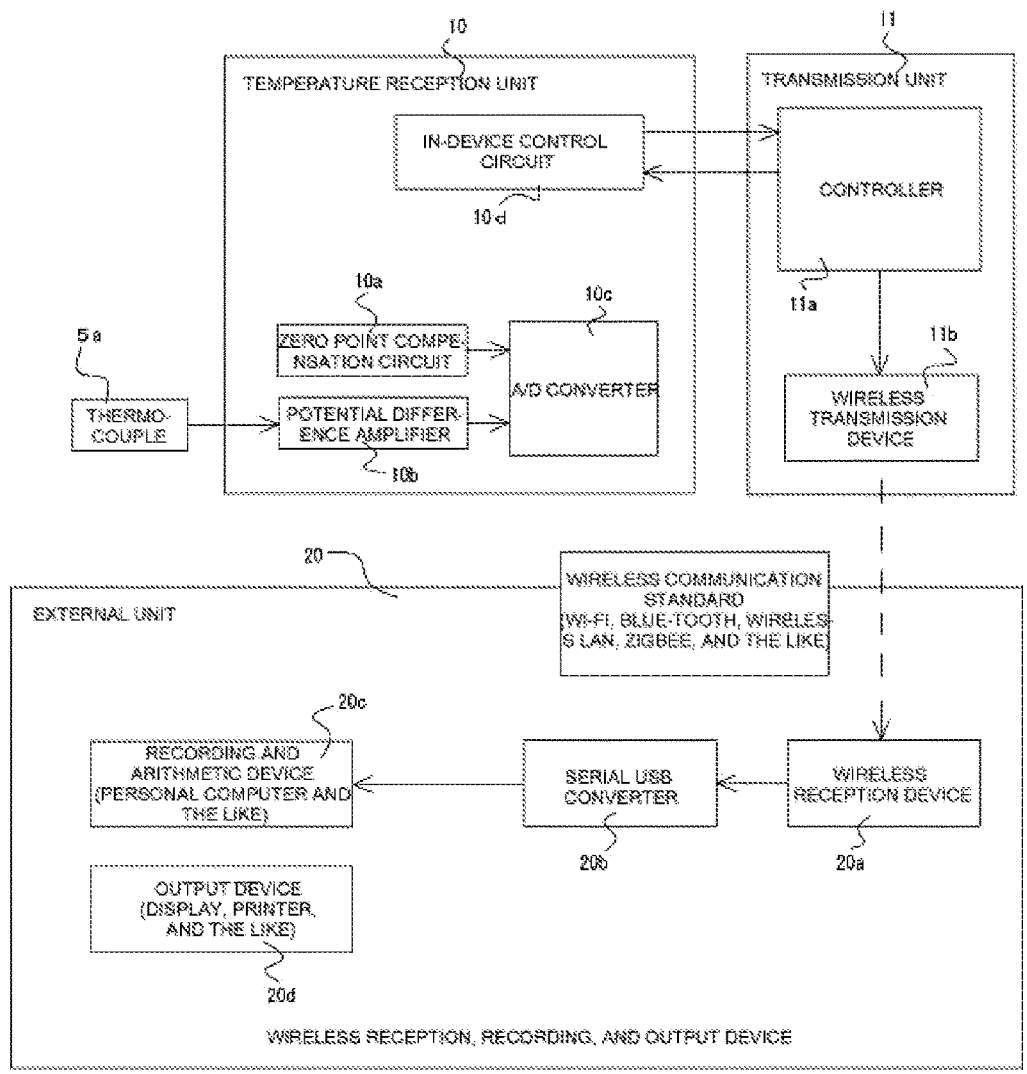
FIG. 4 is a block diagram showing the flow of an electrical signal until a measured temperature is transmitted from a temperature measurement part to an external unit.

Next, the flow of an electrical signal until the measured temperature is transmitted from the thermocouple 5a to the external unit 20 will be described with reference to FIG. 4. In this example, the flow of an electrical signal in the case in which the temperature measurement part 5 is constituted using the thermocouple 5a is shown. Respective arrows in FIG. 4 indicate the flow of an electrical signal indicating the temperature of the rotary tool 4 measured by the thermocouple 5a. Based on the form of a signal transmission route, a wired system is indicated by a solid line, and a wireless system is indicated by a broken line. In this example, the temperature reception unit 10 includes a zero point compensation circuit 10a, a potential difference amplifier 10b, an A/D (analog/digital) converter 10c, and an in-device control circuit 10d. In addition, the transmission unit 11 includes a controller 11a and a wireless transmission device 11b.

In addition, the external unit 20 is constituted using a wireless reception, recording, and output device. The wireless reception, recording, and output device 20 includes a wireless reception device 20a, a serial USB (Universal Serial Bus) converter 20b, a recording and arithmetic device 20c such as a personal computer, and an output device 20d such as a display or a printer, which are arranged from the upstream side to the downstream side in the direction of flow of an electrical signal. In addition, Wi-Fi (wireless fidelity), Blue-tooth, wireless LAN (local Area Network), ZigBee, and the like may be used as the wireless communication standard between the wireless reception device 20a, indicated by the broken line in FIG. 3. Information about the temperature measured in the vicinity of the lower end (i.e. the tip) of the rotary tool 4 is transmitted to the external unit 20 using such a wireless communication device.

Figure 5:
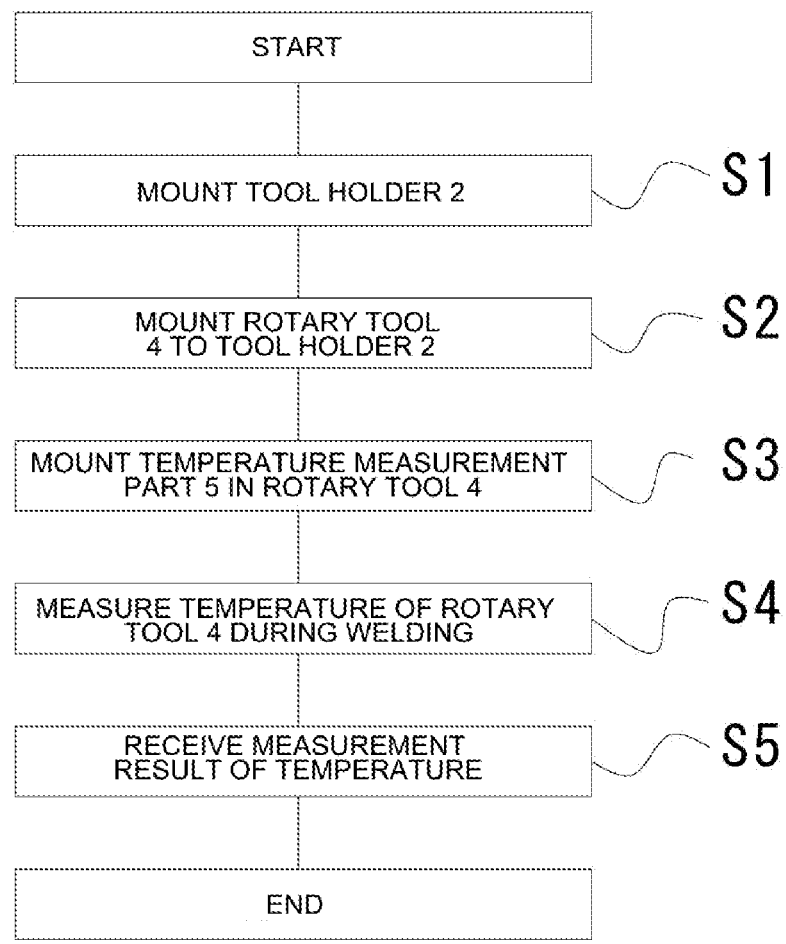
FIG. 5 is a flowchart showing an example of a temperature measurement process of the friction stir welding device body according to the present invention.

Next, the temperature measurement process in the friction stir welding device body according to the present invention will be described with reference to FIG. 5. In the temperature measurement process, a process S1 of mounting the tool holder 2, a process S2 of mounting the rotary tool 4 to the tip (i.e. the lower end) of the tool holder 2 using the rotary tool fixing nut and the fixing screws 3, a process S3 of mounting the temperature measurement part 5 in the hollow channel 26a and the outer edge channel 26b (and in an auxiliary channel 26c for the probe, which will be described later) of the rotary tool 4, a process S4 of measuring the temperature of the rotary tool 4, which is rotated about the same axis as the tool holder 2, using the thermocouple 5a, and a process S5 of the electronic board 6 receiving the result measured by the thermocouple 5a are sequentially performed.

Figure 6:
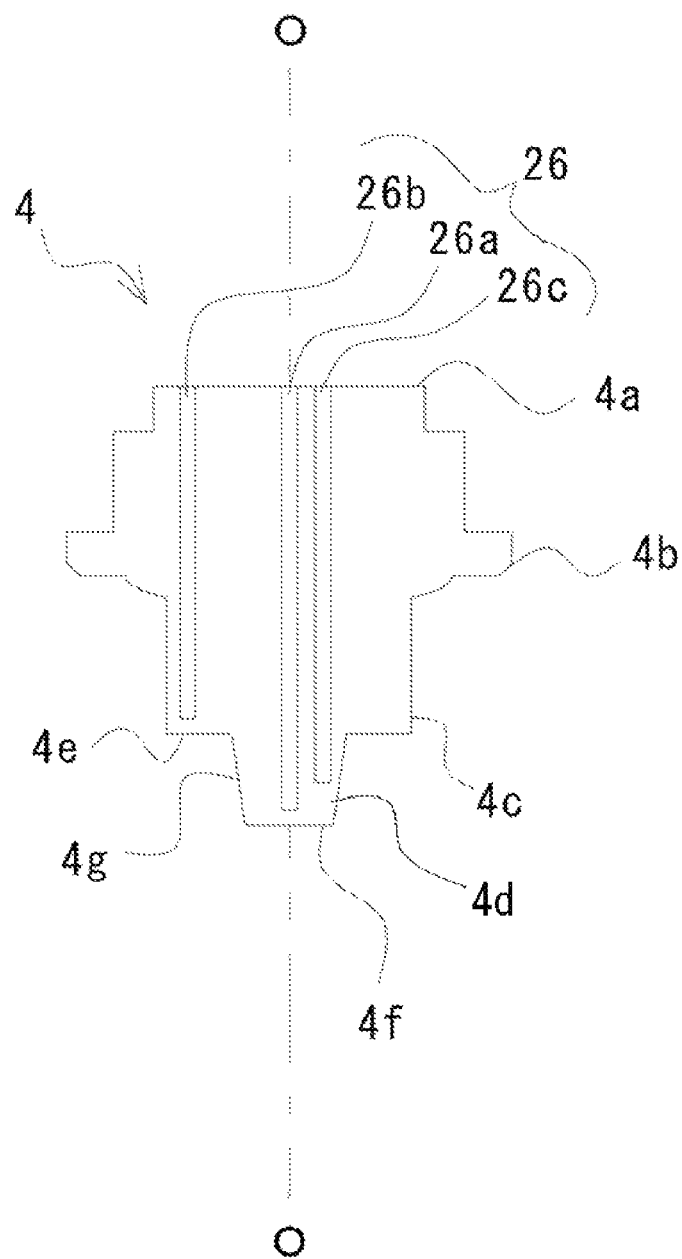
FIG. 6 is a sectional view showing a modification of the rotary tool shown in FIGS. 2 and 3.

Next, a modification of the rotary tool 4 shown in FIGS. 2 and 3 will be described with reference to FIG. 6, and a temperature measurement method using the same will be described. First, the rotary tool 4 of FIG. 6 is generally identical in construction to the rotary tool 4 shown in FIGS. 2 and 3 except that a temperature measurement channel 26 is further provided. Specifically, an auxiliary channel 26c for the probe, which extends from the upper end 4a of the shoulder part 4d to the intermediate position of the probe part 4d in the upward-downward direction, is provided between the hollow channel 26a and the outer edge channel 26b in the radial direction. The position of the lower end of the auxiliary channel 26c for the probe is generally the intermediate position of the probe part 4d in the depth direction. However, in the case in which the probe part 4d is formed in the shape of a taper, the diameter of which is gradually decreased toward the lower end thereof, as shown in FIG. 6, the lower end of the auxiliary channel 26c extends downward to the durable limit mentioned in relation to the hollow channel 26a.

In friction stir welding, the thermal effects of the junction in the plate thickness direction may also be considered. Specifically, at the time of friction stir welding, the uniformity of temperature in the depth direction may not be guaranteed. This is particularly remarkable in the case in which the members to be welded are thick. The reason for this is that nonuniformity of the composition flow at the time of friction stir welding occurs, with the result that the welded state of the entire area in the depth direction (i.e. in the plate thickness direction) becomes nonuniform. The inventors of the present application have also paid attention to this point. In order to perform measurement in real time even in the depth direction at the time of welding, at least one auxiliary channel (i.e. at least one auxiliary channel for the probe) is provided at the probe part, in addition to the lower end channel and the outer edge channel.

In the case in which the auxiliary channel is provided at the probe part of the rotary tool, it is possible to observe the temperature of the middle part of the lower end channel and the outer edge channel. Particularly, in the case in which the plate thickness is large, as described above, it is extremely beneficial to measure the temperature in the channel 26c in order to avoid the possibility of the welded state of the entire area in the depth direction (i.e. in the plate thickness direction) becoming nonuniform and to realize uniform plastic flow over the entire plate thickness. That is, in the case in which the temperature measurement part 5 is disposed at the probe tip part 4f, the probe middle part 4g, and the shoulder part 4c of the rotary tool 4, it is possible to indirectly observe heat generation distribution throughout the entire plate thickness of the members to be welded from the temperatures of the respective parts at the time of welding and to achieve ideal heat generation distribution by optimizing the respective parameters of the friction stir welding conditions.

Next, a temperature measurement method that enables the optimization of the friction stir welding conditions at the time of welding different materials will be described with reference to FIGS. 10(a), 10(b), and 10(c). Two members to be welded that are made of different materials are provided by being made to abut each other in the friction stir welding device according to the present invention, the center of the axis of rotation of the rotary tool 4 is disposed right above the butting line of the members to be welded, and welding is commenced. During welding, the outer edge channel 26b of the rotary tool 4 is rotated about the butting line of the members to be welded, whereby the process of welding the respective members to be welded is repeatedly iterated.

In the friction stir welding device according to the present invention, it is possible to perform intermittent temperature measurement from the start of welding to the end of welding at each time at which the outer edge channel 26b of the rotary tool 4 is positioned on the respective members to be welded used for different material welding through control to synchronize temperature measurement timing and the rotation of the rotary tool 4. Specifically, temperature measurement is performed after the outer edge channel 26b in the rotary tool 5 that rotates in the clockwise direction on the butting line X-X of the members to be welded shown in FIG. 10(a) passes through α1 from β2 and enters γ1 until the outer edge channel 26b exits from γ1. In the temperature measurement, the time of rotation of the rotary tool 4 that is required until the outer edge channel 26b in the rotary tool 4 exits after entering at a predetermined angle may be set as an allowable temperature measurement time, and the results of temperature measured during the time may be averaged. Alternatively, temperatures at a plurality of points may be measured while being synchronized with the rotation of the rotary tool within the allowable temperature measurement time, and the temperatures may be averaged.

Figure 10:
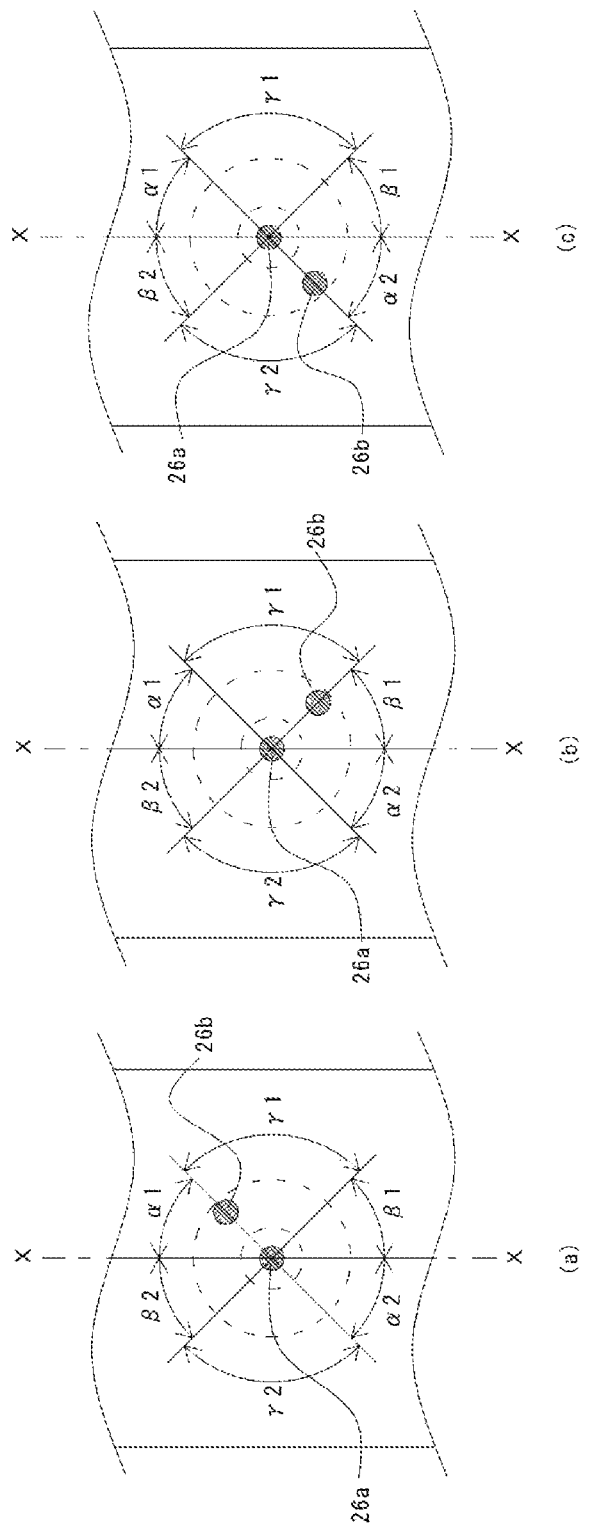
FIG. 10 is a schematic plan view illustrating temperature measurement timing when different members to be welded are welded.

Subsequently, as shown in FIG. 10(b), the temperature is not measured after the outer edge channel 26b in the rotary tool 5 enters β1 and moves to α2 until the outer edge channel 26b exits from α2. Since the butting line X-X is provided in the region between β1 and α2, the temperatures of the members to be welded, which are butted, are easily affected by each other, and an error occurs in the measured temperature. Subsequently, temperature measurement is performed after the outer edge channel 26b shown in FIG. 10(c) enters γ2 until the outer edge channel 26b exits from γ2, which is set as allowable temperature measurement time, in the same manner as in the case in which the outer edge channel 26b in the rotary tool 5 passes through γ1. Subsequently, temperature measurement at a predetermined angle is repeated by synchronizing the temperature measurement timing described above and the rotation of the rotary tool 4, whereby it is possible to observe the temperature of the members to be welded during welding.

Consequently, it is possible to observe deformation resistances in the current temperatures of the members to be welded, which are used for different material welding, and to recognize the difference between the deformation resistances of the respective members to be welded, whereby it is possible to take measures. For example, it is possible to restrain the reduction of deformation resistance by cooling a member to be welded having low deformation resistance or to accelerate the reduction of deformation resistance by heating a member to be welded having high deformation resistance, with the result that it is possible to realize equivalent plastic flow by reducing the difference between the deformation resistances of the members to be welded, whereby it is possible to achieve different material welding using friction stir welding.

Meanwhile, the friction stir welding device according to the present invention may also be applied to a so-called flat rotary tool, although an example of a rotary tool having a probe part has been described in the above description. Specifically, although not shown, a rotary tool having a cylindrical shoulder part that is rotatable about an axis of rotation and has a lower end surface formed in an approximately planar shape is used. The shoulder part has the same outer edge channel as the above-described shoulder part, but the channel of the rotary tool is different from that of the above-described rotary tool in that, since no probe part is provided, the lower end of a hollow channel positioned in the center of rotation extends to the vicinity of the lower end of the shoulder part.

Figure 11:
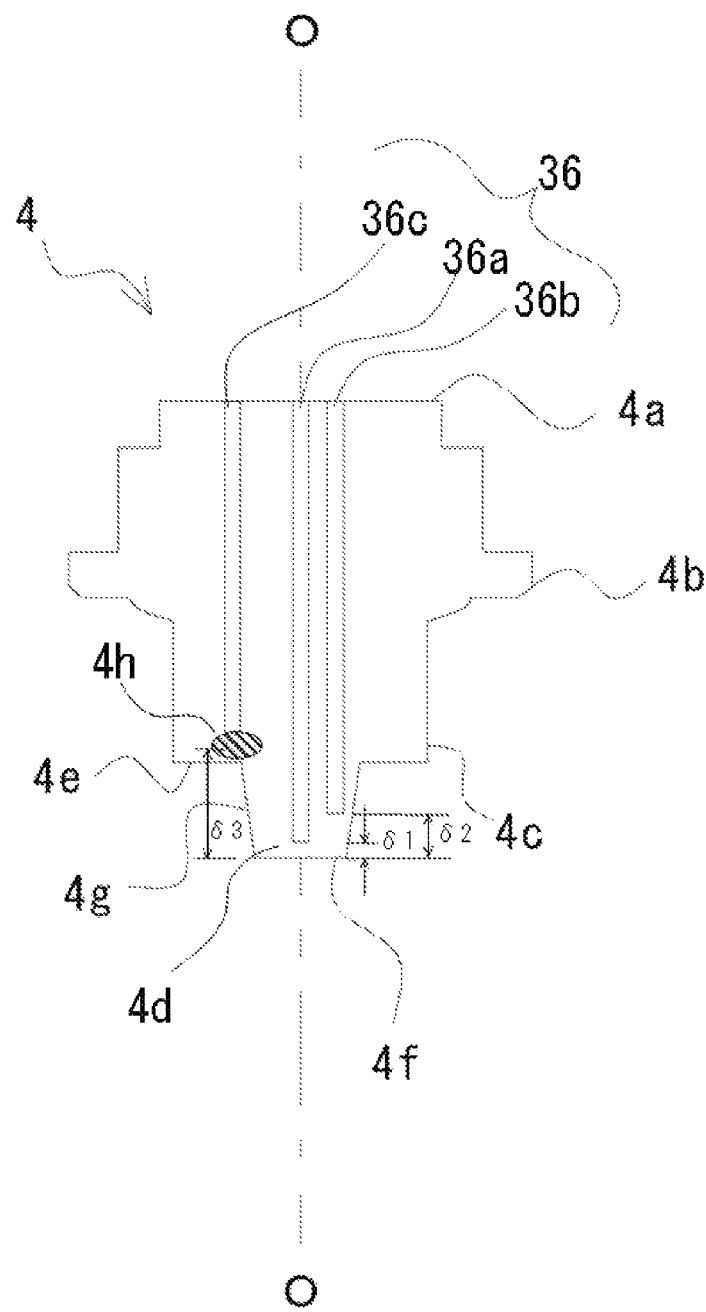
FIG. 11 is a sectional view showing a modification of the rotary tool shown in FIGS. 2, 3, and 6.

Next, a modification of the rotary tool 4 shown in FIGS. 2, 3, and 6 will be described with reference to FIG. 11, and a temperature measurement method using the same will be described. First, the rotary tool 4 of FIG. 11 is generally identical in construction to the rotary tool 4 shown in FIGS. 2, 3, and 6 except that a temperature measurement channel 36 (in particular, a channel 36c) is further provided. A lower end channel 36a and an auxiliary channel 36b for a probe are almost the same as those shown in FIG. 6. Specifically, a hollow lower end channel 36a, which extends from the upper end 4a of the shoulder part 4b to the vicinity of the lower end of the probe part 4d, an auxiliary channel 36b for the probe, which extends from the upper end 4a of the shoulder part 4b to the intermediate position of the probe part 4d in the upward-downward direction, and a hollow root channel 36c, which extends from the upper end 4a of the shoulder part 4b to the vicinity of the junction of the shoulder part 4b and the probe part 4d, are provided.

The position of the lower end of the root channel 36c in the depth direction may extend downward to the durable limit mentioned in relation to the hollow channel 26a of FIGS. 2, 3, and 6. Meanwhile, the positions of the lower ends of the root channel 36c, the lower end channel 36a, and the auxiliary channel 36b for the probe in the radial direction may be positioned as follows in machining. The lower end channel 36a may be positioned on almost the same axis as the axis of rotation O-O, the auxiliary channel 36b may be positioned in the vicinity of the outer edge of the probe part 4d, and the root channel 36c may be positioned in the vicinity of the junction of the shoulder part 4b and the probe part 4d. However, the positions in the radial direction are positions for convenience of machining. The lower end channel 36a may be offset from the axis of rotation O-O, the auxiliary channel 36b may be spaced apart from the outer edge of the probe part 4d, and the root channel 36c may be positioned (a root portion 4h) adjacent to the axis of rotation O-O within the range of diameter of the probe part 4d.

As will be described later in Experimental Example 2, the initial temperature of the root portion 4h of the probe part 4d increases more slowly than that of the lower end 4f of the probe part 4d, but the maximum temperature of the root portion 4h of the probe part 4d almost approximates that of the lower end 4f of the probe part 4d. When seeing the change in deviation of the temperature of the lower end channel 36a and the temperature of the root channel 36c from Experimental Example 2, it is possible to predict that the temperature of the probe part 4d of the rotary tool 4 is approaching the maximum temperature. In the example of FIG. 11, the root channel 36c is provided in consideration of this point.

Experimental Example 1

The hollow channel 26a and the outer edge channel 26b were provided in the rotary tool 4, another channel 26b was provided at the lower surface of the shoulder part 4c so as to be positioned in the vicinity of the root of the probe part 4d, and measurement of the actual temperature was performed.

Figure 7:
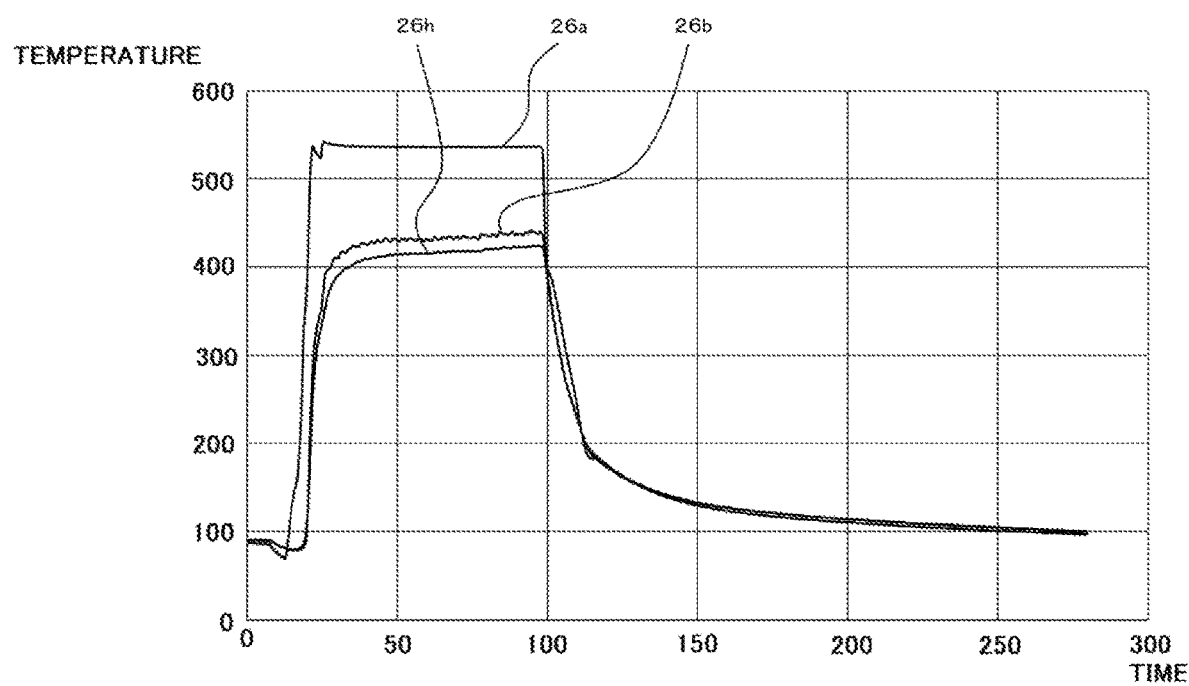
FIG. 7 is a graph showing a result of actual temperature measurement performed on the rotary tool shown in FIG. 9.
Figure 8:
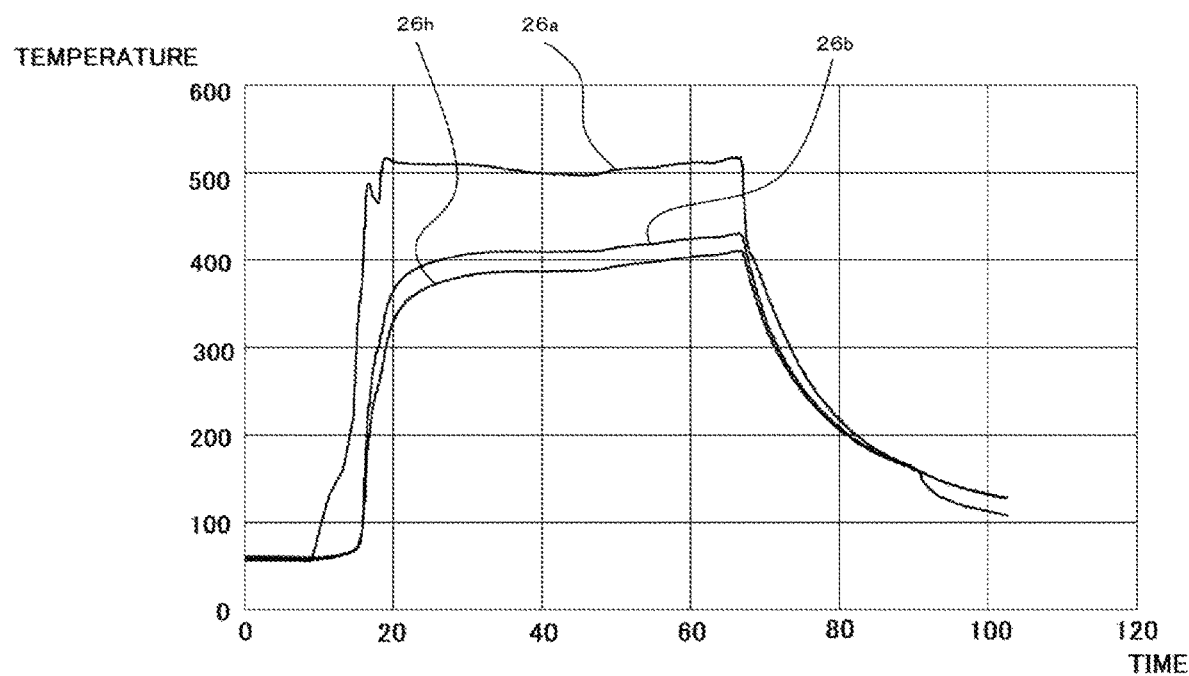
FIG. 8 is a graph showing another result of actual temperature measurement performed on the rotary tool shown in FIG. 9.
Figure 9:
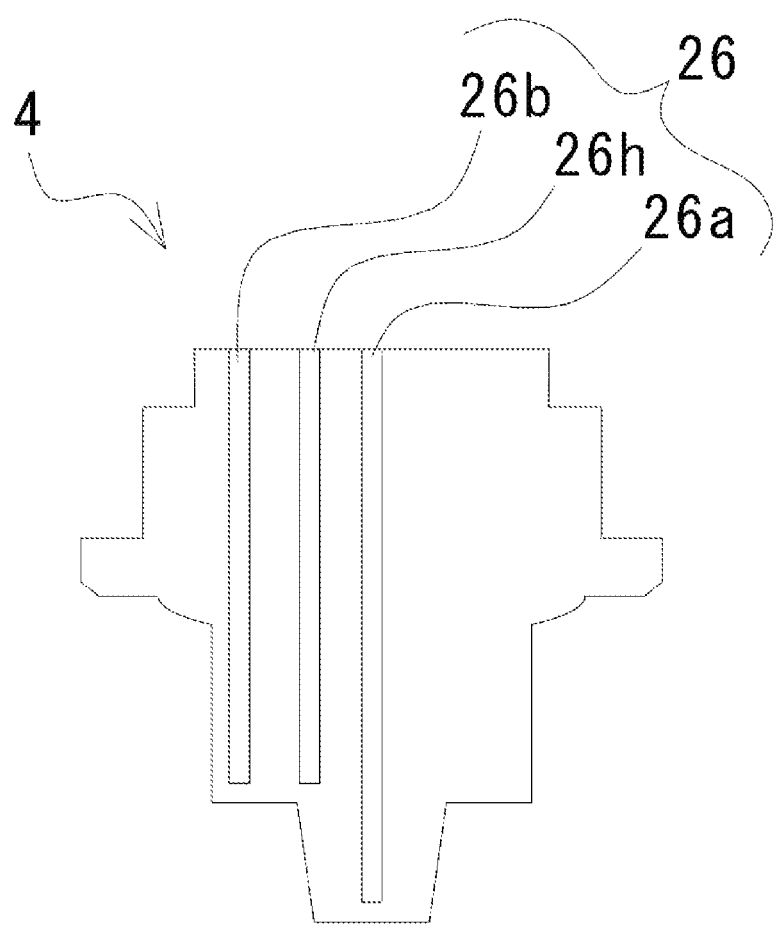
FIG. 9 is a schematic sectional view showing the rotary tool on which a temperature measurement test is actually performed.

FIGS. 7 and 8 are graphs showing the temperatures of the respective parts of the rotary tool in Condition 1 and Condition 2, in which friction stir welding tests were performed using members to be welded having a plate thickness of 6 mm (A6063). In welding conditions used in the tests in Condition 1 and Condition 2, the rotational speed of the tool was set to 1500 rev/min and the movement speed of the tool was set to 300 mm/min in both conditions, and only the tool load (no conditions stated in a document) in Condition 2 was set to be low.

No difference in the external appearance of the members to be welded during the welding tests in Condition 1 and Condition 2 and no difference in the temperature of the rotary tool during welding were observed. In Condition 1, burrs having nonuniform height and resembling waves were generated in the vicinity of the shoulder of the rotary tool in response to the movement of the tool, and the temperature of the shoulder outer edge part A was changed at small intervals. In Condition 2, no burrs were generated, and the change in temperature of the respective parts of the rotary tool was gentle.

When comparing the temperatures of the respective parts of the rotary tool in Condition 1 and Condition 2, the temperatures of the respective parts of the rotary tool in Condition 2 were generally lower than those of the respective parts of the rotary tool in Condition 1. The temperature difference at the probe tip part B was about 40 degrees, the temperature difference at the probe root part C was about 20 degrees, and the temperature difference at the shoulder outer edge part A was about 20 degrees. The temperature difference was generated due to the difference between the tool loads in Condition 1 and Condition 2. The reason for this is that, in Condition 2, in which the tool load was set to be lower than in Condition 1, friction generated in the rotary tool and the members to be welded was reduced. In Condition 1, therefore, high heat was input to the members to be welded, with the result that the deformation resistance of the members to be welded was excessively reduced. In the vicinity of the shoulder outer edge part, some of the members to be welded were extruded, with the result that burrs were generated. In Condition 2, however, it is considered that the input of heat into the members to be welded was moderately restrained, and plastic flow optimal for friction stir welding was caused while the deformation resistance of the members to be welded was not excessively reduced, whereby welding was achieved without generating burrs. In addition, the small temperature change found in the temperature of the shoulder outer edge part A in Condition 1 results from the temporary repeated increase and decrease of friction generated in the shoulder outer edge part and the members to be welded when the members to be welded, the deformation resistance of which is excessively reduced, were extruded by the rotary tool.

Experimental Example 2

The hollow channel 36a, the auxiliary channel 36b for the probe, and the root channel 36c were provided in the rotary tool 4, and measurement of the actual temperature was performed.

Figure 12:
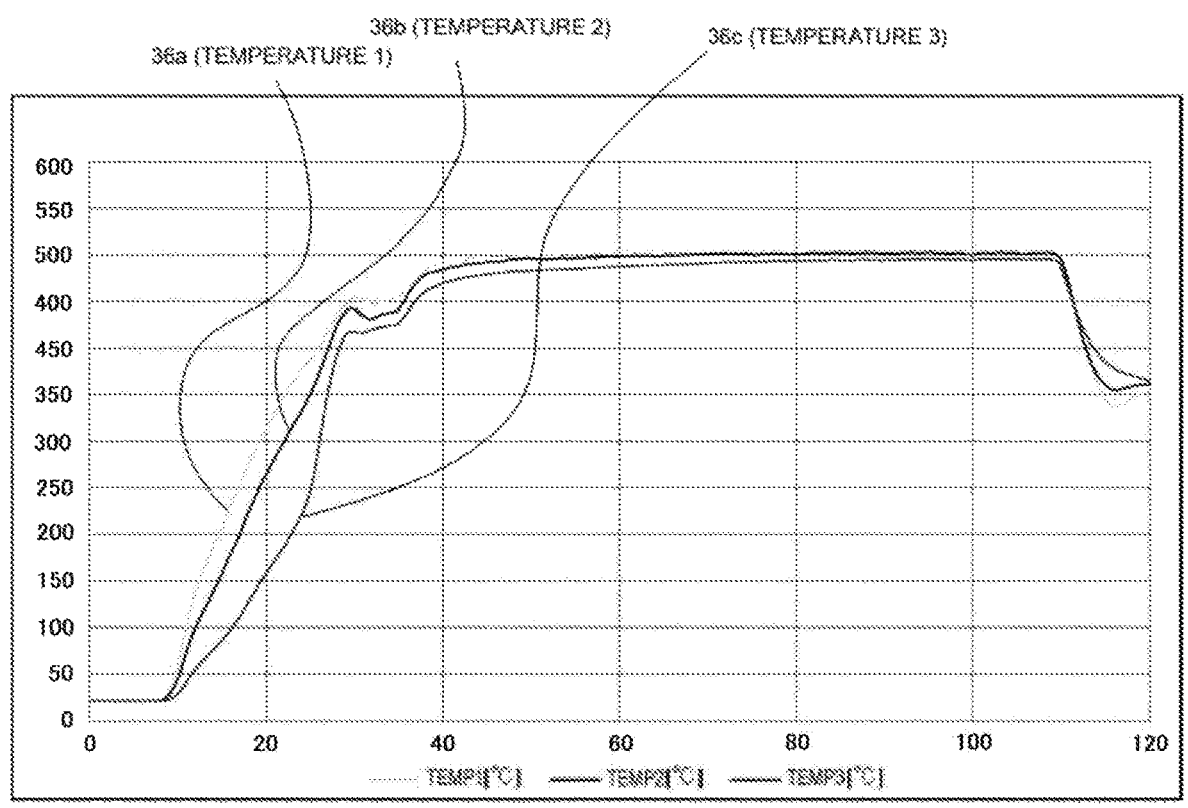
FIG. 12 is a graph showing a result of actual temperature measurement performed on the rotary tool shown in FIG. 11.
Figure 13:
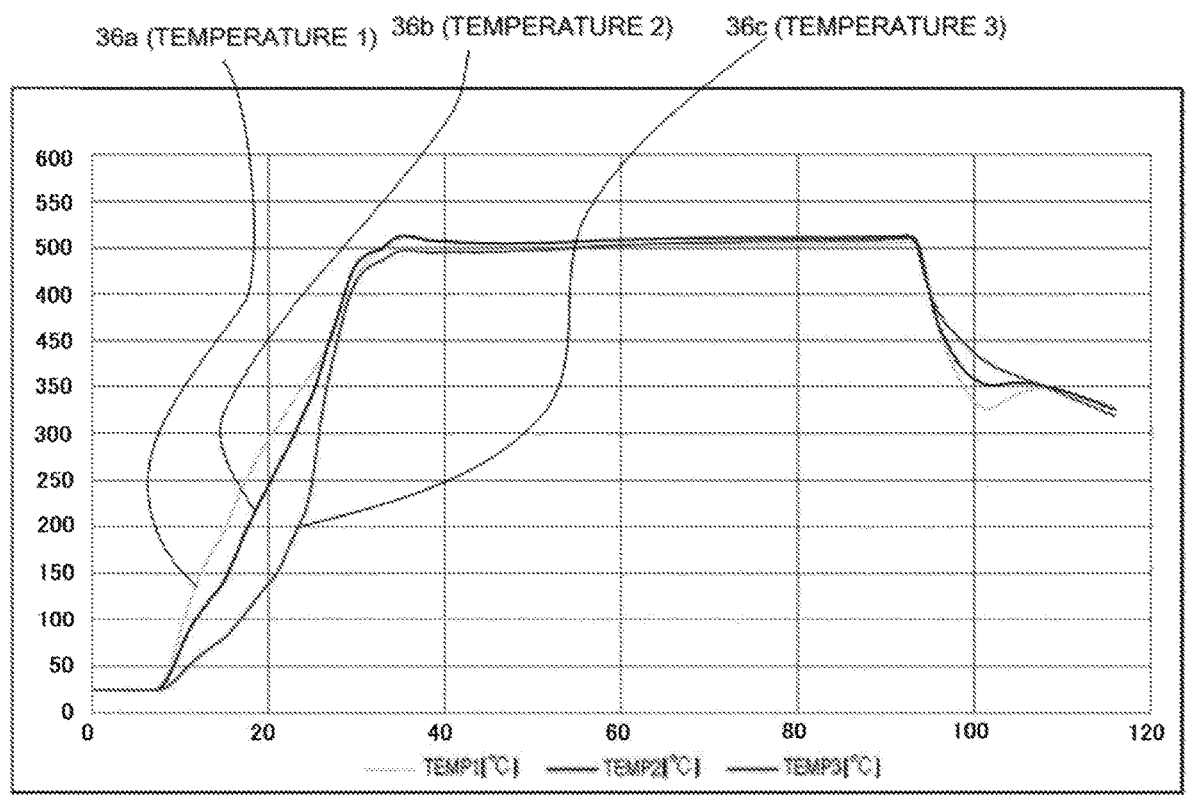
FIG. 13 is a graph showing another result of actual temperature measurement performed on the rotary tool shown in FIG. 11.
Figure 14:
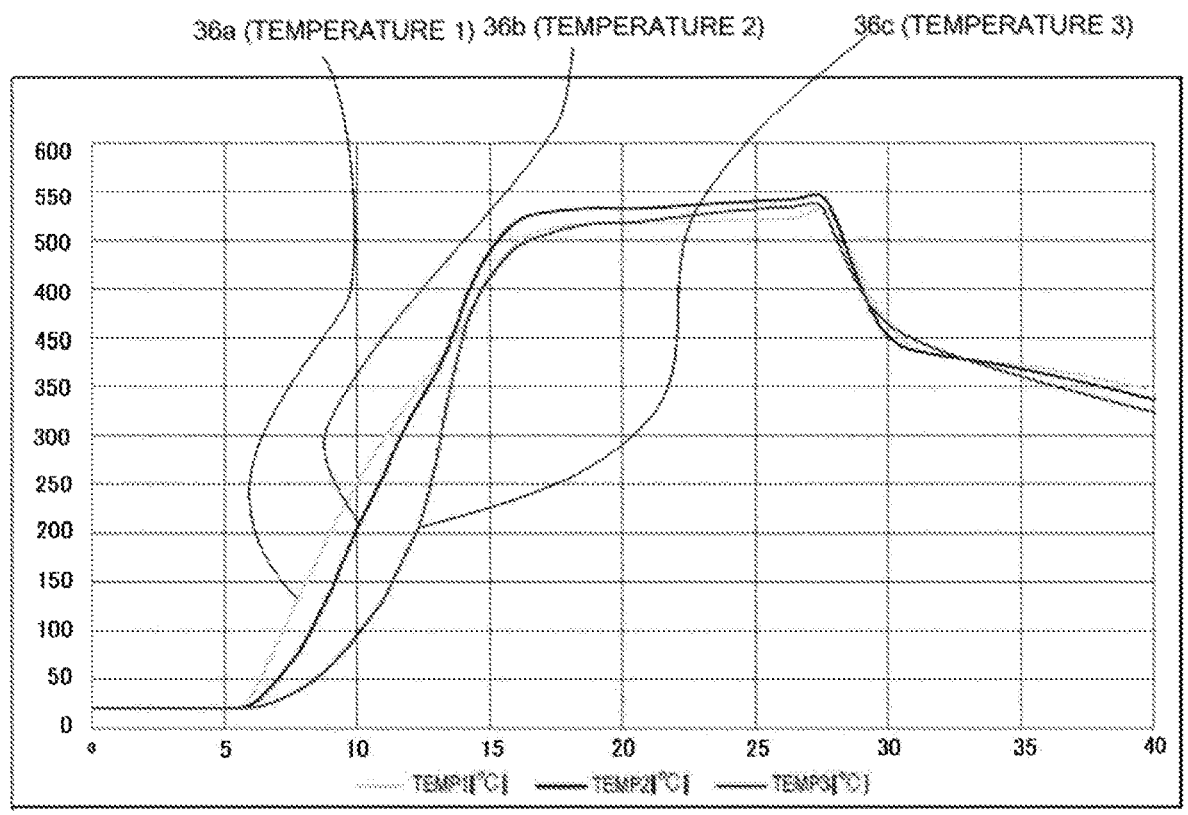
FIG. 14 is a graph showing a further result of actual temperature measurement performed on the rotary tool shown in FIG. 11.

FIGS. 12 to 14 are graphs showing the changes in temperature (° C./time (min)) of the respective channels 36a to 36c when friction stir welding was performed using the rotary tool 4 of FIG. 11. In Experimental Example 2 of FIGS. 12 to 14, a 3D FSW device made by Hitachi, Ltd. was used, and a rotary tool including a probe part 4d having a tip diameter of 5 mm, a root diameter of 8 mm, and a length of 7.2 mm, and a shoulder part having a diameter of 18 mm was used as the rotary tool 4. In addition, the central axes of the hollow channel 36a, the auxiliary channel 36b for the probe, and the root channel 36c were respectively offset 0.91 mm, 1.47 mm, and 2.02 mm from the axis of rotation O-O.

In addition, as the members to be welded, AZ611 having a plate thickness of 8 mm was used in FIG. 12, A5083-01 having a plate thickness of 8 mm was used in FIG. 13, and A6N01-T5 having a plate thickness of 8 mm was used in FIG. 14 to perform friction stir welding tests. As the machining conditions, the machining speed is 1200 rpm, the feed speed (i.e. the tool movement speed) is 20 m/min, and the depth of cut is 8 mm in FIG. 12, the machining speed is 600 rpm, the feed speed is 20 m/min, and the depth of cut is 8 mm in FIG. 13, and the machining speed is 1500 rpm, the feed speed is 50 m/min, and the depth of cut is 8 mm in FIG. 14.

Referring to FIGS. 12 to 14, regardless of the machining conditions, the temperatures of the hollow channel 36a and the auxiliary channel 36c for the probe increase almost equally from the initial temperatures to the maximum temperatures thereof, whereas the temperature of the root channel 36c increases more gently than the temperatures of the lower end channel 36a and the auxiliary channel 36c for the probe, the difference in temperature therebetween increases over time, the temperature of the root channel 36c abruptly increases after a predetermined amount of time (for example, 12 to 13 min in the example of FIG. 12), and the time incurred for the root channel 36c to reach the maximum temperature and the maximum temperature of the root channel 36c are almost the same as those of the hollow channel 36a and the auxiliary channel 36c for the probe.

Consequently, the change in the temperature of the lower end channel 36a and the temperature of the root channel 36c is measured in real time, and in the case in which the temperature of the root channel 36c abruptly increases from the stage at which the difference between the temperature increase rates thereof is great, it can be seen that the temperatures thereof approximates the maximum temperatures. In addition, in the case in which the change in the temperature of the lower end channel 36a and the temperature of the root channel 36c is measured, it is generally possible to measure the change in the temperature of the probe part 4d without measuring other parts.

Although the embodiments of the present invention have been described with reference to the accompanying drawings, the detailed construction of the present invention is not limited to the embodiments. The scope of the present invention is limited by the scope of the claims, rather than the description of the embodiments. Furthermore, the scope of the present invention includes all changes within the meaning and scope equivalent to the scope of the claims.

INDUSTRIAL APPLICABILITY

The friction stir welding device according to the present invention is capable of indirectly measuring the temperature of the members to be welded in real time during friction stir welding and of establishing optimum friction stir welding conditions for the members to be welded that are used. As a result, the present invention contributes to realizing various welding processes, such as thick plate welding and different material welding, which are difficult to achieve using conventional friction stir welding methods.

DESCRIPTION OF REFERENCE SYMBOLS

2 Tool holder
3 Fixing screws
4 Rotary tool
4f Probe part
4g Shoulder part
5 Temperature measurement part
5a Temperature measurement element (Thermocouple)
6 Electronic board
7 Power supply part
8 Hollow hole
9 Rotary tool fixing nut
10 Temperature reception unit
11 Transmission unit
12 Transmission antenna
20 External unit
26 Blind holes
26a Hollow channel 26b Outer edge channel
26c Auxiliary channel for probe
S1 to S5 Processes

The invention claimed is:
1. A friction stir welding device, comprising:
a rotary tool having a cylindrical shoulder part rotatable about an axis of rotation and a probe coupled to a lower end of the shoulder part, configured to rotate about the axis of rotation, and protruding downward so as to contact members to be welded, wherein temperatures at different positions in a depth direction in the probe are simultaneously measured;
a tool holder connected to an upper side of the rotary tool and configured to rotate about the axis of rotation in cooperation with the rotary tool; and
a device body having a mechanism connected to an upper side of the tool holder, rotating the rotary tool and the tool holder about the axis of rotation, and moving the rotary tool and the tool holder in an axial direction so as to press the members to be welded,
wherein the rotary tool comprises:
a hollow lower end channel extending from an upper end of the shoulder part to a vicinity of a lower end of the probe;
a hollow outer edge channel spaced apart from the axis of rotation in a radial direction to a vicinity of an outer edge of the shoulder part and extending from the upper end of the shoulder part to a vicinity of the lower end of the shoulder part; and
a hollow auxiliary channel for the probe extending from the upper end of the shoulder part to an intermediate position of the probe part in the depth direction,
wherein temperature measurement elements are disposed in the hollow lower end channel and the hollow outer edge channel, the temperature measurement elements being located in a vicinity of lower ends of the hollow lower end channel and the hollow outer edge channel,
wherein the friction stir welding device further comprises a transmission means for transmitting a temperature measurement result created using a temperature measurement means from the respective temperature measurement elements, and
wherein a temperature measurement element is disposed in the auxiliary channel for the probe, the temperature measurement element being located in a vicinity of a lower end of the auxiliary channel for the probe, a temperature measurement result being created using the temperature measurement means from the temperature measurement element.
2. The friction stir welding device according to claim 1, wherein the hollow lower end channel extends along a substantially same axis as the axis of rotation, and
wherein the auxiliary channel for the probe is spaced apart from the axis of rotation in the radial direction in the probe part.
3. A friction stir welding device comprising:
a rotary tool having a cylindrical shoulder part rotatable about an axis of rotation and a probe coupled to a lower end of the shoulder part, configured to rotate about the axis of rotation, and protruding downward so as to contact members to be welded, wherein temperatures at different positions in a depth direction in the probe are simultaneously measured;
a tool holder connected to an upper side of the rotary tool and configured to rotate about the axis of rotation in cooperation with the rotary tool; and
a device body having a mechanism connected to an upper side of the tool holder, rotating the rotary tool and the tool holder about the axis of rotation, and moving the rotary tool and the tool holder in an axial direction so as to press the members to be welded,
wherein the rotary tool comprises:
a hollow lower end channel extending from an upper end of the shoulder part to a vicinity of a lower end of the probe;
a hollow root channel extending from an upper part of the shoulder part to a vicinity of a junction of the shoulder part and the probe; and
a hollow auxiliary channel for the probe extending from the upper end of the shoulder part to an intermediate position of the probe part in the depth direction,
wherein temperature measurement elements are disposed in the hollow lower end channel and the hollow root channel, the temperature measurement elements being located in a vicinity of lower ends of the hollow lower end channel and the hollow root channel,
wherein the friction stir welding device further comprises a transmission means for transmitting a temperature measurement result created using a temperature measurement means from the respective temperature measurement elements, and
wherein a temperature measurement element is disposed in the auxiliary channel for the probe, the temperature measurement element being located in a vicinity of a lower end of the auxiliary channel for the probe, a temperature measurement result being created using the temperature measurement means from the temperature measurement element.
4. The friction stir welding device according to claim 1, wherein the temperature measurement means and the transmission means are mounted to the tool holder.
5. The friction stir welding device according to claim 1, wherein the temperature measurement means is mounted to the device body.
6. The friction stir welding device according to claim 1, wherein the lower end channel and the outer edge channel are arranged in a substantially same radial direction, and
wherein the temperature measurement means, which is synchronized with rotation of the rotary tool, configured to perform temperature measurement when the respective channels are positioned on one of two members to be welded and to perform the temperature measurement again when the respective channels are positioned on the other of the two members to be welded.
7. The friction stir welding device according to claim 6, wherein the temperature measurement means is configured to perform the temperature measurement while the rotary tool is rotated by a predetermined angle after the channels in the rotary tool enter the respective members to be welded and move a predetermined angle, which is set for an allowable temperature measurement time, and averages results of the temperature measurement.
8. The friction stir welding device according to claim 7, wherein measurement by the temperature measurement means is performed at a plurality of points in one of the two members to be welded while being synchronized with the rotation of the rotary tool within the allowable temperature measurement time.
9. The friction stir welding device according to claim 6, wherein the temperature measurement means is configured to perform the temperature measurement when the channels in the rotary tool enter the respective members to be welded at a predetermined angle.

* * * * *